United States Patent
Everingham et al.

[11] Patent Number: 5,094,218
[45] Date of Patent: Mar. 10, 1992

[54] ENGINE EXHAUST GAS RECIRCULATION (EGR)

[75] Inventors: Gary Everingham; Thomas A. Davenport, both of Chatham, Canada

[73] Assignee: Siemens Automotive Limited, Chatham, Canada

[21] Appl. No.: 673,877

[22] Filed: Mar. 22, 1991

[51] Int. Cl.$^5$ .................... F03M 25/07; F16K 31/08
[52] U.S. Cl. ................................ 123/571; 251/65; 251/129.08; 335/222
[58] Field of Search ............... 123/568, 569, 571, 339, 123/585; 251/65, 129.08, 129.15, 129.16; 361/147, 152, 154; 335/222, 278, 279

[56] References Cited

U.S. PATENT DOCUMENTS

| | | | |
|---|---|---|---|
| 4,643,394 | 2/1987 | Shimura et al. | 251/129.08 |
| 4,690,371 | 9/1987 | Bosley et al. | 251/65 |
| 4,749,167 | 6/1988 | Gottschall | 251/65 |
| 4,805,582 | 2/1989 | Braun et al. | 123/571 |
| 4,883,025 | 11/1989 | Richeson, Jr. | 251/65 |
| 4,961,413 | 10/1990 | Grey et al. | 123/571 |

Primary Examiner—Willis R. Wolfe
Attorney, Agent, or Firm—George L. Boller; Russel C. Wells

[57] ABSTRACT

EGR is controlled by a valve whose actuator is a moving electromagnetic coil through which control current representing the desired degree of valve opening is conducted. The coil is disposed in an air gap of a magnetic circuit such that the magnetic flux passes radially through the coil. A coil spring biases the valve closed when there is no current flow through the coil. When control current is conducted through the coil, there is an interaction with the magnetic flux causing the exertion of an electromagnetic force on the coil against the spring force. Relative pressure acting on opposite sides of the valve will assist the coil motion. As a result the coil moves in a direction to increasingly compress the spring until the spring force balances the electromagnetic force. Consequently the valve is opened in an amount proportional to the control current. The motion of the coil is also electromagnetically damped, and a position sensor provides a feedback signal of the valve position.

16 Claims, 1 Drawing Sheet

ENGINE EXHAUST GAS RECIRCULATION (EGR)

FIELD OF THE INVENTION

This invention relates to the recirculation of exhaust gas in an internal combustion engine.

BACKGROUND AND SUMMARY OF THE INVENTION

Exhaust gas recirculation, commonly referred to as EGR, is used to dope the air-fuel mixture introduced into the combustion chamber space for the purpose of minimizing the amount of oxides of nitrogen created during the combustion process. An EGR valve is used to control the recirculation flow, and the capabilities of electronics technology make it desirable to use an electrically controlled EGR valve. A limitation on the performance of known EGR valves resides in their inability to respond as precisely as the precise control potential that resides in the controlling electronics. This is due essentially to the fact that EGR valves are electromechanical devices.

The present invention is an answer to the need for a more responsive EGR valve which can provide more precise control of the recirculated exhaust gas. Briefly, the invention embodies a moving electromagnetic coil as the prime mover for positioning the EGR valve mechanism. The coil is disposed in a magnetic field, and control current representing desired coil position is passed through the coil. The current interacts with the magnetic field in such a way that the resultant axial force acting on the coil balances that of a mechanical bias spring force which also acts axially on the coil. The force on the coil resulting from the interaction of the electric current with the magnetic field is, for a constant magnetic field, proportional to the magnitude of the electric current so that in order to balance the bias spring force the coil will be axially positioned in proportion to the electric current.

Such an arrangement offers very significant advantages for an EGR valve. The proportionality of the coil positioning to the electric current flow through the coil can be made highly linear. The amount of axial travel which can be executed by the coil is comparatively long relative to certain other EGR valves and also relative to the axial dimension of the coil itself. Such considerations enable a more precise and responsive EGR valve to be created. By associating a position sensor with the moving coil to sense coil position, and using a signal from the position sensor as feedback to the EGR control electronics, a highly accurate and responsive EGR system can result. It is also feasible to have the electronics provide self-diagnosis of the EGR valve for giving ar alert against possible and actual EGR valve malfunction. Because the EGR is mounted in an environment where it may be subject to certain unavoidable vibrations, a further aspect of the EGR valve of this invention is the inclusion of an electromagnetic damping feature which can attenuate the influence of such vibrations on the moving coil. Still further features of the invention relate to the specific manner of implementation.

The foregoing, as well as additional features, advantages, and benefits of the invention, will be seen in the ensuing description which is accompanied by a drawing. The drawing discloses a presently preferred embodiment of the invention according to the best mode contemplated at the present time in carrying out the invention.

DESCRIPTION OF THE PREFERRED EMBODIMENT

Figure 1:
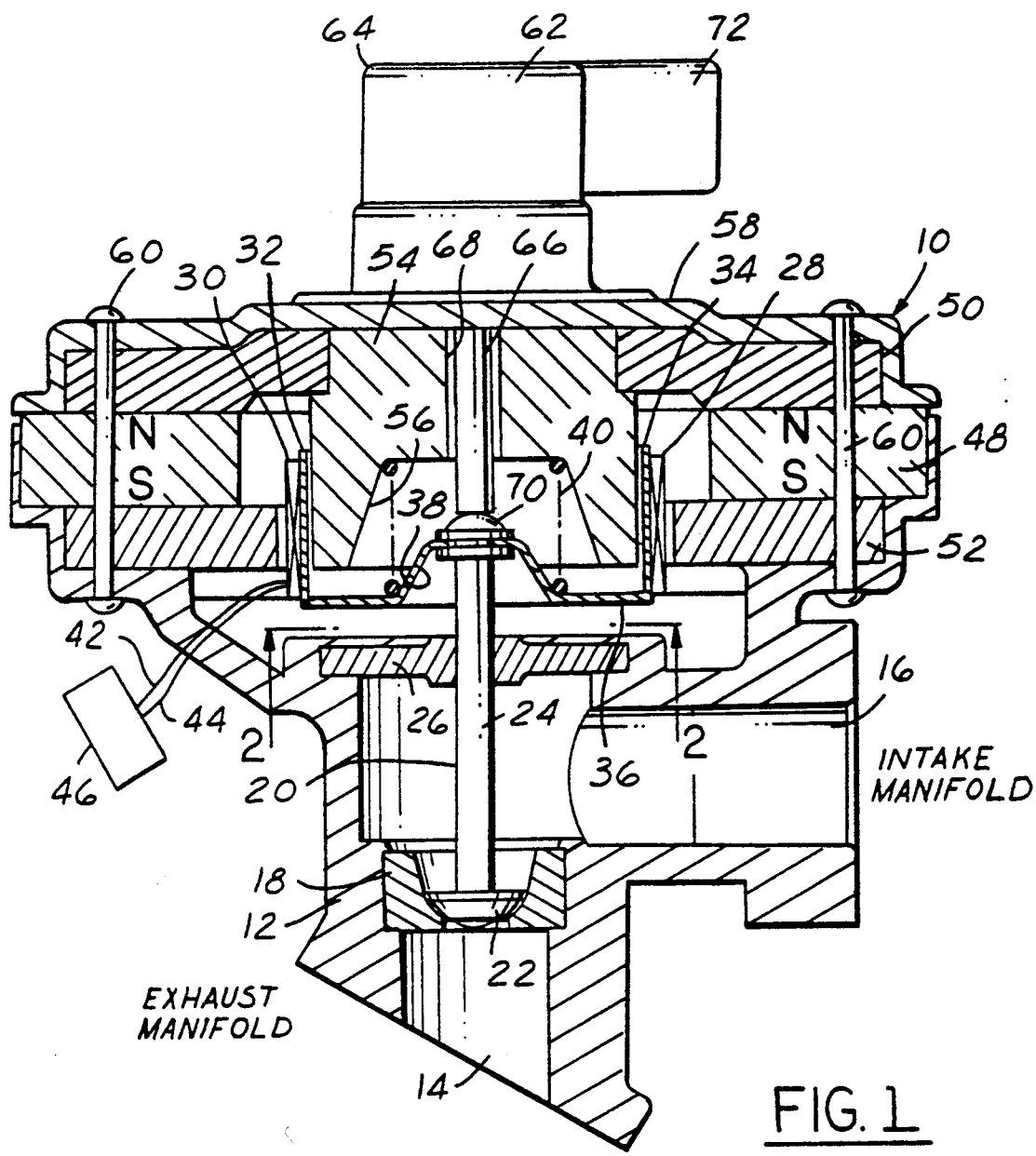
FIG. 1 is a longitudinal cross-sectional view through an EGR valve embodying principles of the invention.
Figure 2:
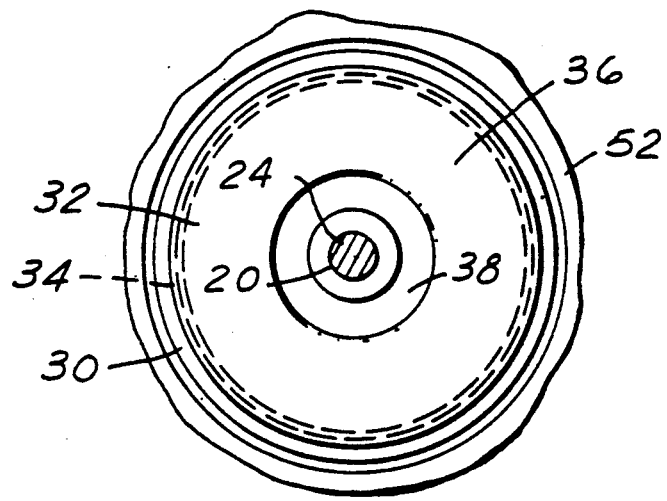
FIG. 2 is a transverse view in the direction of arrows 2—2 in FIG. 1.

The drawing shows an EGR valve 10 comprising a body 12 having an inlet 14 for connection to an exhaust manifold of an engine and an outlet 16 for connection to the engine's intake manifold. Within body 12 in the passage between inlet 14 and outlet 16 is a valve seat 18 with which a valve 20 coacts to control flow between the inlet and outlet. FIG. 1 shows valve 20 closing the passage to flow. Valve 20 comprises a head 22 and a stem 24. Stem 24 passes from head 22 through a hole in a valve guide 26 that is mounted on body 12 in the manner shown to guide axial motion of the valve toward and away from the valve seat. The end of valve stem 24 opposite valve head 22 attaches to an electromechanical actuator 28 that functions to axially position the valve relative to the seat for setting a desired flow restriction between inlet 14 and outlet 16.

Actuator 28 comprises an electromagnetic coil 30 that is disposed on a bobbin 32. Bobbin 32 has a circular cylindrical sidewall 34 and a transverse end wall 36. Both bobbin 32 and coil 30 are coaxial with valve 20, and stem 24 attaches to end wall 36 in any suitable manner. The central region of end wall 36 is shaped to form a spring seat 38 for seating one end of a helical spring 40. Bobbin 32 is a non-magnetic, electrically conductive material, such as aluminum or an aluminum alloy. One way of making coil 30 is by winding a length of magnet wire around sidewall 34 in any suitable winding pattern, which by way of example could include multiple overlying layers. The winding of the magnet wire may be processed in such a way that the coil becomes bonded as a mass to the outside of the bobbin sidewall. Leads from the ends of the magnet wire may be connected to respective conductors 42, 44, such as braided cable, which are in turn brought out through a suitable opening in body 12 to an electrical connector plug 46 via which the coil can be connected to a source of control current.

Actuator 28 further comprises a magnetic circuit that provides a magnetic flux with which current flowing through roil 30 interacts in a manner that will be described hereinafter in more detail. This magnetic circuit comprises a permanent magnet source 48, two end caps 50, 52 of magnetically permeable material, and a core 54 also of magnetically permeable material. Permanent magnet source 48 is shown to have a circular annular shape and is polarized in the axial direction parallel to the co-axis of bobbin 32 and coil 30, for example N-S as indicated in FIG. 1. End cap 50 has a circular annular shape and its radially outer margin is disposed flat against the North pole side of permanent magnet source 48. The radially inner portion of end cap 50 is fitted to one end of core 54 in the manner shown so that core 54 is supported on the end cap. Core 54 extends axially from end cap 51 toward the other end cap 52. The axial end of core 54 opposite end cap 50 passes radially inwardly of coil 30 and sidewall 34 of bobbin 32. End cap 52 has a circular annular shape with its radially outer margin disposed flat against the South pole face of permanent magnet source 48. The radially inner portion of end cap 52 stops short of coil 30. Therefore, there exists an annular air gap between the radially inner portion of end cap 52 and core 54, and in this air gap the magnetic flux between the two parts is predominantly radial and extends around the full circumferential extent of the air gap. It is within this air gap that both coil 30 and sidewall 34 of bobbin 32 are disposed.

The transverse surface of core 54 that faces end wall 36 of bobbin 32 contains a central depression 56 for seating the opposite end of spring 40. The EGR valve is so constructed that when there is no electric current flowing in coil 30, spring 40 forces valve head 22 to fully seat on seat 18 and close the flow path between inlet 14 and outlet 16.

The parts 48, 50, and 52 are held in assembly on body 12 by means of a cover 58 which fits over the parts in the manner illustrated, and several fasteners 60 which pass through aligned holes in the parts and fasten cover 58 to body 12. Centrally disposed on the opposite side of cover 58 from core 54 is the main body 62 of a position sensor 64. The position sensor has an elongated follower 66 that extends from main body 62 through a central clearance hole in cover 58 and a central through-hole 68 in core 54. Follower 66 is spring-biased by an internal spring within main body 62 to bear lightly against a button 70 at the end of item 24 opposite head 22. Accordingly, the position sensor is able to follow the position of valve 20 in relation to seat 18 and provide a signal representing the position of valve 20 via terminals of an electrical connector 72 projecting radially of main body 62. This signal may be used by an engine management computer as feedback from the EGR valve for purposes such as those mentioned earlier. By way of example the position sensor may comprises a variable resistance whose resistance is related to the valve position.

The operation of EGR valve 10 is as follows. A control current conducted via conductors 42, 44 after plug 46 has been connected to a control current source such as the engine management computer for example is flowed through coil 30 in an amount which represents a desired displacement of valve 20 away from seat 18. The current flow in &he coil interacts with the magnetic field that passes radially through the coil in the air gap between end cap 52 and core 54 such that an electromagnetic force proportional to said current is exerted on the coil in the axial direction away from seat 18. The sum of this electromagnetic force and the spring force acting on valve member 20 is such that coil 30 will begin to move axially away from seat 18. Since the coil is united with bobbin 32 and the bobbin is attached directly to valve member 20, the valve member is moved away from seat 18. The motion results in increased compression of spring 40 and will continue until such time as the increasing spring force equals the electromagnetic force at which time the motion ceases and the valve member stays in its newly assumed position until the current changes. At times during engine operation, positive and negative pressures in the valve passage will also have an influence on valve positioning. This should be taken into account in designing the actuator. The effective area of the valve is calculated and based on the anticipated positive and negative pressures, the proper spring rate is calculated. During the motion, two additional events occur.

The signal from position sensor 64 changes in relation to the position of the valve member, and the motion is damped by electromagnetic damping caused by the generation of induced electric current in the sidewall of bobbin 32 due to its passage through the radial magnetic field in the air gap between end cap 52 and core 54. The magnitude of the damping is a function of the characteristics of the bobbin, the magnetic flux density, and the rate at which the electric current in the coil changes. For control purposes, an EGR valve may be designed to provide a degree of damping that is consistent with the required response. A motivation for including electromagnetic damping in the EGR valve is due to the possibility that engine vibrations, if not attenuated, may adversely act upon the relatively low mass of the coil and bobbin. The provision of electromagnetic damping may successfully attenuate such undesired vibrations. While bobbin 32 is circumferentially continuous, the fact that it has an endwall may reduce the electromagnetic damping if inducer current is shorted through the end wall. Other configurations may be capable of producing greater damping, and for example bobbin 32 could alternatively be made of plastic and a separate damping coil or damping ring could be mounted on the plastic bobbin.

From the foregoing description it should be understood that the position which valve 20 assumes in relation to seat 18 is proportional to the control current flowing in coil 30. The greater the current, the greater the valve opening, and the lesser the current, the lesser the valve opening. The control electronics that provides the control current to the coil may be constructed in any desired manner. A simple D.C. signal may be used, and for quicker response it may be desirable to impose a dither on such a signal. The current may also be a pulse width modulated D.C. signal at a suitable frequency.

The detailed description which has just been given enables an EGR valve embodying the inventive principles to be designed and fabricated using conventional engineering and manufacturing practices. While a presently preferred embodiment has been illustrated and described, it should be understood that the principles may be embodied in other embodiments which are equivalent to the following claims.

What is claimed is:

1. In an internal combustion engine having an intake system and an exhaust system that are disposed respectively upstream and downstream of combustion chamber space, and exhaust gas recirculation means, including an electrically controlled exhaust gas recirculation (EGR) valve, for recirculating some of the gas in the exhaust system back to the intake system, the improvement in means for electrically controlling said EGR valve which comprises an electromagnetic coil having terminations via which electric control current that represents desired control of said EGR valve can be passed through said coil, means supporting said coil for bodily axial motion along a path of travel, means to bodily axially position said coil along said path of travel, including means providing a magnetic field that passes radially through said coil for interaction with electric control current flow through said coil to cause said coil to be bodily axially positioned to a position along said path of travel that is correlated with the electric control current flowing through said coil, and means to control said EGR valve in accordance with the position of said coil along said path of travel, in which said coil is disposed on a cylindrical-shaped, non-magnetic element through which said magnetic field also radially passes, said cylindrical-shaped, non-magnetic element includes a transverse wall that is operatively connected with said EGR valve, and said means to bodily axially position said coil along said path of travel includes a helical spring disposed between said transverse wall of said cylindrical-shaped, non-magnetic element and a transverse surface of a magnetically permeable core that is disposed radially inwardly of said coil, said magnetically permeable core being a portion of said means providing a magnetic field.

2. In an internal combustion engine having an intake system and an exhaust system that are disposed respectively upstream and downstream of combustion chamber space, and exhaust gas recirculation means, including an electrically controlled exhaust gas recirculation (EGR) valve, for recirculating some of the gas in the exhaust system back to the intake system, the improvement in means for electrically controlling said EGR valve which comprises an electromagnetic coil having terminations via which electric control current that represents desired control of said EGR valve can be passed through said coil, means supporting said coil for bodily axial motion along a path of travel, means to bodily axially position said coil along said path of travel, including means providing a magnetic field that passes radially through said coil for interaction with electric control current flow through said coil to cause said coil to be bodily axially positioned to a position along said path of travel that is correlated with the electric control current flowing through said coil, and means to control said EGR valve in accordance with the position of said coil along said path of travel, and in which said coil is disposed on a cylindrical-shaped, non-magnetic, electrically conductive element through which said magnetic field also radially passes.

3. The improvement set forth in claim 2 in which said coil is disposed on an outside cylindrical-shaped surface of said cylindrical-shaped, non-magnetic, electrically conductive element.

4. The improvement set forth in claim 2 in which said cylindrical-shaped, non-magnetic, electrically conductive element includes a transverse wall that is operatively connected with said EGR valve.

5. The improvement set forth in claim 4 in which said means to bodily axially position said coil along said path of travel includes a helical spring disposed between said transverse wall of said cylindrical-shaped, non-magnetic, electrically conductive element and a transverse surface of a magnetically permeable core that is disposed radially inwardly of said coil, said magnetically permeable core being a portion of said means providing a magnetic field.

6. The improvement set forth in claim 5 further including a position sensor for providing a signal representing the axial position of said coil along said path of travel, and in which said magnetically permeable core comprises a through-hole, said position sensor comprising an operative coupling extending from a body portion of said position sensor through said through-hole of said magnetically permeable core into operative coupling with said coil.

7. The improvement set forth in claim 2 in which said means providing a magnetic field that passes radially through said coil comprises a permanent magnet source for said magnetic field and magnetically permeable structure for conducting the magnetic field from said permanent magnet source to cause the magnetic field passing radially through said coil to be distributed around the full circumference of said coil.

8. The improvement set forth in claim 7 in which said permanent magnet source is polarized in a direction parallel to the axis of said coil and is disposed radially outwardly of said coil, and said magnetically permeable structure comprises respective magnetically permeable end caps disposed at respective poles of said permanent magnet source and extending radially inwardly therefrom and a magnetically permeable core that extends axially from one of said end caps toward the other of said end caps and cooperatively defines with said other end cap an annular air gap within which said coil is disposed.

9. In an internal combustion engine having an intake system and an exhaust system that are disposed respectively upstream and downstream of combustion chamber space, and exhaust gas recirculation means, including an electrically controlled exhaust gas recirculation (EGR) valve, for recirculating some of the gas in the exhaust system back to the intake system, the improvement in means for electrically controlling said EGR valve which comprises an electromagnetic coil having terminations via which electric control current that represents desired control of said EGR valve can be passed through said coil, means supporting said coil for bodily axial motion along a path of travel, means to bodily axially position said coil along said path of travel, including means providing a magnetic field that passes radially through said coil for interaction with electric control current flow through said coil to cause said coil to be bodily axially positioned to a position along said path of travel that is correlated with the electric control current flowing through said coil, and means to control said EGR valve in accordance with the position of said coil along said path of travel, and further including means forming a closed electrically conductive circuit which is separate from but moves with said coil through said magnetic field and in which said magnetic field induces electric current during such motion thereby to electromagnetically damp the motion of said coil.

10. A gas valve comprising an inlet, an outlet, a valve mechanism for controlling the flow of gas between said inlet and outlet, and an electromechanical actuator for operating said valve mechanism to control the flow between said inlet and outlet characterized in that said electromechanical actuator comprises an electromagnetic coil having terminations via which electric control current that represents desired gas flow between said inlet and said outlet can be passed through said coil, means supporting said coil for bodily axial motion along a path of travel, means to bodily axially position said coil along said path of travel, including means providing a magnetic field that passes radially through said coil for interaction with electric control current flow through said coil to cause said coil to be bodily axially positioned to a position along said path of travel that is correlated with the electric control current flowing through said coil, and means for operating said valve mechanism in accordance with the position of said coil, in which said coil is disposed on a cylindrical-shaped, non-magnetic, electrically conductive element which moves with said coil through said magnetic field and in which said magnetic field induces electric current during such motion thereby to electromagnetically damp the motion of said coil.

11. A valve as set forth in claim 10 characterized further in that said cylindrical-shaped, non-magnetic, electrically conductive element includes a transverse wall that is operatively connected with said valve mechanism, and said means to bodily axially position said coil along said path of travel includes a helical spring disposed between said transverse wall of said cylindrical-shaped, non-magnetic, electrically conductive element and a transverse surface of a magnetically permeable core that is disposed radially inwardly of said coil, said magnetically permeable core being a portion of said means providing a magnetic field.

12. An EGR valve for use in controlling the recirculation of gas from an internal combustion engine's exhaust system to its intake system, said EGR valve comprising an inlet for connection to the exhaust system and an outlet for connection to the intake system, a valve mechanism for controlling the flow between said inlet and outlet, and an electromechanical actuator for operating said valve mechanism to control the flow between said inlet and outlet characterized in that said electromechanical actuator comprises an electromagnetic coil having terminations via which electric control current that represents desired flow between said inlet and said outlet can be passed through said coil, means supporting said coil for bodily axial motion along a path of travel, means to bodily axially position said coil along said path of travel, including means providing a magnetic field that passes radially through said coil for interaction with electric control current flow through said coil to cause said coil to be bodily axially positioned to a position along said path of travel that is correlated with the electric control current flowing through said coil, and means for operating said valve mechanism in accordance with the position of said coil, and further including means forming a closed electrically conductive circuit which is separate from but moves with said coil through said magnetic field and in which said magnetic field induces electric current during such motion thereby to electromagnetically damp the motion of said coil.

13. An EGR valve as set forth in claim 12 in which said means forming a closed electrically conductive circuit comprises a non-magnetic cylindrical-shaped element on which said coil is disposed.

14. An EGR valve as set forth in claim 12 in which said means providing a magnetic field that passes radially through said coil comprises a permanent magnet source for said magnetic field and magnetically permeable structure for conducting the magnetic field from said permanent magnet source to cause the magnetic field passing radially through said coil to be distributed around the full circumference of said coil.

15. An EGR valve as set forth in claim 14 in which said permanent magnet source is polarized in a direction parallel to the axis of said coil and is disposed radially outwardly of said coil, and said magnetically permeable structure comprises respective magnetically permeable end caps disposed at respective poles of said permanent magnet source and extending radially inwardly therefrom and a magnetically permeable core that extends axially from one of said end caps toward the other of said end caps and cooperatively defines with said other end cap an annular air gap within which said coil is disposed.

16. An EGR valve as set forth in claim 15 further including a position sensor for providing a signal representing the axial position of said coil along said path of travel, and in which said magnetically permeable core comprises a through-hole, said position sensor comprising an operative coupling extending from a body portion of said position sensor through said through-hole of said magnetically permeable core into operative coupling with said coil.

* * * * *